United States Patent
Wang et al.

(10) Patent No.: US 11,882,521 B2
(45) Date of Patent: Jan. 23, 2024

(54) MODE SWITCHING METHOD IN WI-FI NETWORK AND TERMINAL DEVICE

(71) Applicant: Huawei Technologies Co., Ltd., Shenzhen (CN)

(72) Inventors: Tongbo Wang, Shanghai (CN); Ming Zhou, Shanghai (CN); Ji Ding, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 401 days.

(21) Appl. No.: 17/413,668

(22) PCT Filed: Dec. 14, 2018

(86) PCT No.: PCT/CN2018/121337
§ 371 (c)(1),
(2) Date: Jun. 14, 2021

(87) PCT Pub. No.: WO2020/118729
PCT Pub. Date: Jun. 18, 2020

(65) Prior Publication Data
US 2022/0060993 A1     Feb. 24, 2022

(51) Int. Cl.
*H04W 52/02*     (2009.01)
*H04B 7/0413*    (2017.01)

(52) U.S. Cl.
CPC ...... *H04W 52/0245* (2013.01); *H04B 7/0413* (2013.01); *H04W 52/028* (2013.01)

(58) Field of Classification Search
None
See application file for complete search history.

(56) References Cited

U.S. PATENT DOCUMENTS

| 10,070,339 B2 | 9/2018 | Chhabra et al. |
| 2015/0365889 A1* | 12/2015 | Rajendran ............ H04W 16/08 455/453 |
| 2015/0365890 A1 | 12/2015 | Rajendran et al. |
| 2016/0359661 A1 | 12/2016 | Chhabra et al. |
| 2016/0360489 A1 | 12/2016 | Boodannavar et al. |
| 2019/0363768 A1 | 11/2019 | Wang et al. |

FOREIGN PATENT DOCUMENTS

| CN | 101834644 A | 9/2010 |
| CN | 103347293 A | 10/2013 |
| CN | 103888178 A | 6/2014 |
| CN | 106231662 A | 12/2016 |
| WO | 2018129856 A1 | 7/2018 |

\* cited by examiner

*Primary Examiner* — Suhail Khan
(74) *Attorney, Agent, or Firm* — Conley Rose, P.C.

(57) ABSTRACT

A mode switching method in a WI-FI network includes after a terminal device accesses a WI-FI network, the terminal device communicates, in a multiple-input multiple-output (MIMO) mode, with an access point that provides an access service of the WI-FI network. The terminal device obtains first received signal strength and a first throughput of the WI-FI network in the MIMO mode, and when the first received signal strength is greater than a first strength threshold and the first throughput is less than a first throughput threshold, the terminal device switches from the MIMO mode to the single-input single-output (SISO) mode.

18 Claims, 5 Drawing Sheets

MODE SWITCHING METHOD IN WI-FI NETWORK AND TERMINAL DEVICE

CROSS-REFERENCE TO RELATED APPLICATIONS

This application is a U.S. National Stage of International Patent Application No. PCT/CN2018/121337 filed on Dec. 14, 2018, which is hereby incorporated by reference in its entirety.

TECHNICAL FIELD

This application relates to the field of communications technologies, and in particular, to a mode switching method in a Wi-Fi network and a terminal device.

BACKGROUND

After a multiple input multiple output (Multiple Input Multiple Output, MIMO) technology is used for wireless fidelity (Wireless Fidelity, Wi-Fi), a transmission rate greatly increases, a transmission distance of a wireless signal increases, a receiving range of an antenna is further expanded, and signal anti-interference performance is better. However, an additional hardware circuit needs to be added to a terminal device using Wi-Fi, to implement a MIMO function. In this case, power consumption of the terminal device greatly increases, and the increase in the power consumption further affects a battery life of the terminal device. Therefore, one of keys of implementing the MIMO function by the terminal device using Wi-Fi is how to reduce the power consumption.

SUMMARY

This application provides a mode switching method in a Wi-Fi network and a terminal device, to reduce power consumption of the terminal device while implementing a MIMO function. This ensures a battery life of the terminal device.

To achieve the foregoing objective, the following technical solutions are used in the embodiments of this application.

According to a first aspect, a mode switching method in a Wi-Fi network is provided, where the method includes: After a terminal device accesses the Wi-Fi network, the terminal device communicates, in a multiple input multiple output MIMO mode, with an access point that provides an access service of the Wi-Fi network, for example, the terminal receives a plurality of data streams sent by the access point, and sends a plurality of data streams to the access point; the terminal device obtains first received signal strength and a first throughput of the Wi-Fi network in the MIMO mode; and when the first received signal strength is greater than a first strength threshold and the first throughput is less than a first throughput threshold, the terminal device switches from the MIMO mode to a single input single output SISO mode. In the foregoing technical solution, when the terminal device is in the MIMO mode, the received signal strength of the Wi-Fi network is relatively strong, and the throughput is relatively low, it may indicate that current signal quality of the Wi-Fi network is relatively good and an amount of data transmitted by the terminal device per unit of time is relatively small. The terminal device switches from the MIMO mode to the SISO mode, so that power consumption of the terminal device can be reduced, a battery life of the terminal device can be ensured, performance of a service running on the terminal device can be ensured, and therefore, user experience is improved.

With reference to the first aspect, in a first possible implementation of the first aspect, the method further includes: The terminal device obtains second received signal strength of the Wi-Fi network in the SISO mode; and when the second received signal strength is less than a second strength threshold, the terminal device switches from the SISO mode to the MIMO mode. where the first strength threshold is greater than the second strength threshold. For example, the first strength threshold is −65 dBm, the second strength threshold is −76 dBm, and the first throughput threshold is 30 Mbps. In the foregoing possible implementation, when the terminal device is in the SISO mode and the received signal strength of the Wi-Fi network is relatively poor, the terminal device switches from the SISO mode to the MIMO mode, so that the performance of the service running on the terminal device can be ensured, and user experience can be ensured.

With reference to the first possible implementation of the first aspect, in a second possible implementation of the first aspect, a fluctuation value of received signal strength of the Wi-Fi network is greater than a first preset threshold. To be specific, a fluctuation value of received signal strength corresponding to the terminal device changes relatively greatly. For example, the terminal device is in a moving process, and as a distance between the terminal device and the access point that provides the Wi-Fi service becomes longer, the received signal strength of the terminal device gradually decreases. In the foregoing possible implementation, the fluctuation value of the received signal strength of the Wi-Fi network changes greatly, so that switching between the SISO mode and the MIMO mode can be implemented quickly and accurately, in other words, accuracy and a speed of performing mode switching by the terminal device are enhanced, the power consumption of the terminal device can be minimized, and a battery life of the terminal device can be ensured.

With reference to the first aspect, in a third possible implementation of the first aspect, the method further includes: The terminal device obtains a second throughput of the Wi-Fi network and a temperature value of the terminal device in the SISO mode; and when the second throughput is greater than a second throughput threshold and the temperature value of the terminal device is less than a preset temperature threshold, the terminal device switches from the SISO mode to the MIMO mode, where the second throughput threshold is greater than the first throughput threshold. For example, the first strength threshold is −76 dBm, the first throughput threshold is 10 Mbps, the second throughput threshold is 30 Mbps, and the preset temperature threshold is 40° C. In the foregoing possible implementation, When the terminal device is in the SISO mode and transmits a relatively large amount of data, and the current temperature value of the terminal device is relatively small, the terminal device switches from the SISO mode to the MIMO mode, so that power consumption of the terminal device is relatively low, performance of a service running on the terminal device can be improved, and user experience is improved.

With reference to the third possible implementation of the first aspect, in a fourth possible implementation of the first aspect, a fluctuation value of a throughput of the Wi-Fi network is greater than a second preset threshold. To be specific, a fluctuation value of an amount of data transmitted by the terminal device per unit of time changes relatively greatly. For example, if one or more file download services are newly added to the terminal device, the amount of data transmitted by the terminal device per unit of time increases. In the foregoing possible implementation, the fluctuation value of the throughput of the Wi-Fi network changes greatly, so that switching between the SISO mode and the MIMO mode can be implemented quickly and accurately, in other words, the accuracy and the speed of performing mode switching by the terminal device are improved, power consumption of the terminal device can be minimized, the battery life of the terminal device can be ensured, performance of the service running on the terminal device is not affected, and user experience can be improved.

According to a second aspect, a mode switching method in a Wi-Fi network is provided, where the method includes: After a terminal device accesses the Wi-Fi network, the terminal device communicates, in a multiple input multiple output MIMO mode, with an access point that provides an access service of the Wi-Fi network; the terminal device obtains first received signal strength of the Wi-Fi network and a temperature value of the terminal device in the MIMO mode; and when the first received signal strength is greater than a first strength threshold and the temperature value of the terminal device is greater than a preset temperature threshold, the terminal device switches from the MIMO mode to a single input single output SISO mode. For example, the first strength threshold is −76 dBm, and the preset temperature threshold is 40° C. In the foregoing technical solution, when the terminal device is in the MIMO mode, the received signal strength of the Wi-Fi network is relatively good, and a throughput is relatively low, it may indicate that current signal quality of the Wi-Fi network is relatively good and power consumption of the terminal device is relatively high. The terminal device switches from the MIMO mode to the SISO mode, so that power consumption of the terminal device can be reduced, a battery life of the terminal device can be ensured, performance of a service running on the terminal device can be ensured, and therefore, user experience is improved.

With reference to the second aspect, in a first possible implementation of the second aspect, a fluctuation value of the temperature value of the terminal device is greater than a third preset threshold. In the foregoing possible implementation, when the temperature value of the terminal device in the SISO mode is relatively high, switching between the SISO mode and the MIMO mode can be implemented quickly and accurately, in other words, accuracy and a speed of performing mode switching by the terminal device are improved, power consumption of the terminal device can be minimized, the battery life of the terminal device can be ensured, performance of a service running on the terminal device is not affected, and user experience is improved.

According to a third aspect, a mode switching method in a Wi-Fi network is provided, where the method includes: After a terminal device accesses a Wi-Fi network, the terminal device communicates, in a multiple input multiple output MIMO mode, with an access point that provides an access service of the Wi-Fi network; the terminal device obtains, in the MIMO mode, a bandwidth of a first fixed network accessed by the Wi-Fi network; and when the bandwidth of the first fixed network is less than a first bandwidth threshold, the terminal device switches from the MIMO mode to a single input single output SISO mode. For example, the first bandwidth threshold is equal to a second bandwidth threshold, and both the first bandwidth threshold and the second bandwidth threshold are 100 Mbps. In the foregoing technical solution, when a bandwidth of a first fixed network accessed by the Wi-Fi network is relatively small, network quality that can be provided by the Wi-Fi network is limited, and even if the terminal device is in the MIMO mode, the terminal device cannot provide a larger bandwidth. The MIMO mode further causes relatively large power consumption. The terminal device is switched from the MIMO mode to the single input single output SISO mode to reduce power consumption of the terminal device, ensure a battery life of the terminal device, and provide the larger bandwidth within a limited range.

With reference to the third aspect, in a first possible implementation of the third aspect, the method further includes: The terminal device obtains, in the SISO mode, a bandwidth of a second fixed network accessed by the Wi-Fi network; and when the bandwidth of the second fixed network is greater than a second bandwidth threshold, the terminal device switches, from the SISO mode to the MIMO mode, where the first bandwidth threshold is less than or equal to the second bandwidth threshold. In the foregoing possible implementation, when the bandwidth of the second fixed network accessed by the Wi-Fi network is relatively large, the terminal device is switched from the SISO mode to the MIMO mode, so that performance of a service running on the terminal device can be ensured, and therefore, user experience is ensured.

With reference to the third aspect or the first possible implementation of the third aspect, in a second possible implementation of the third aspect, a fluctuation value of a bandwidth of a fixed network accessed by the Wi-Fi network is greater than a fourth preset threshold. In the foregoing possible implementation, when the fluctuation value of the bandwidth of the fixed network is relatively large, switching between the SISO mode and the MIMO mode can be quickly and accurately implemented according to the method, in other words, accuracy and a speed of performing mode switching by the terminal device can be improved, power consumption of the terminal device can be minimized, and the battery life of terminals can be ensured.

According to a fourth aspect, a terminal device is provided, where the terminal device includes a processor and a memory, the memory stores instructions and data, and the processor runs the instructions to enable the terminal device to perform the following operation: after accessing a Wi-Fi network, communicating, in a multiple input multiple output MIMO mode, with an access point that provides an access service of the Wi-Fi network; obtaining first received signal strength and a first throughput of the Wi-Fi network in the MIMO mode; and when the first received signal strength is greater than a first strength threshold and the first throughput is less than a first throughput threshold, switching from the MIMO mode to a single input single output SISO mode.

With reference to the fourth aspect, in as first possible implementation of the fourth aspect, the terminal device further performs the following operation: obtaining second received signal strength of the Wi-Fi network in the SISO mode: and when the second received signal strength is less than a second strength threshold, switching from the SISO mode to the MIMO mode, where the first strength threshold is greater than the second strength threshold.

With reference to the first possible implementation of the fourth aspect, in a second possible implementation of the fourth aspect, a fluctuation value of received signal strength of the Wi-Fi network is greater than a first preset threshold.

With reference to the fourth aspect, in a third possible implementation of the fourth aspect, the terminal device further performs the following operation: obtaining a second throughput of the Wi-Fi network and a temperature value of the terminal device in the SISO mode; and when the second throughput is greater than a second throughput threshold and the temperature value of the terminal device is less than a preset temperature threshold, switching from the SISO mode to the MIMO mode, where the second throughput threshold is greater than the first throughput threshold.

With reference to the third possible implementation of the fourth aspect, in a fourth possible implementation of the fourth aspect, a fluctuation value of a throughput of the Wi-Fi network is greater than a second preset threshold.

According to a fifth aspect, a terminal device is provided, where the terminal device includes a processor and a memory, the memory stores instructions and data, and the processor runs the instructions to enable the terminal device to perform the following operations: after accessing a Wi-Fi network, communicating, in a multiple input multiple output MIMO mode, with an access point that provides an access service of the Wi-Fi network; obtaining first received signal strength of the Wi-Fi network and a temperature value of the terminal device in the MIMO mode; and when the first received signal strength is greater than a first strength threshold and the temperature value of the terminal device is greater than a preset temperature threshold, switching from the MIMO mode to a single input single output SISO mode.

With reference to the fifth aspect, in a first possible implementation of the fifth aspect, a fluctuation value of the temperature value of the terminal device is greater than a third preset threshold.

According to a sixth aspect, a terminal device is provided, where the terminal device includes a processor and a memory, the memory stores instructions and data, and the processor runs the instructions to enable the terminal device to perform the following operations: after accessing a Wi-Fi network, communicating, in a multiple input multiple output MIMO mode, with an access point that provides an access service of the Wi-Fi network; obtaining, in the MIMO mode, a bandwidth of a first fixed network accessed by the Wi-Fi network; and when the bandwidth of the first fixed network is less than a first bandwidth threshold, switching from the MIMO mode to a single input single output SISO mode.

With reference to the sixth aspect, in a first possible implementation of the sixth aspect, the terminal device further performs the following operation: obtaining, in the SISO mode, a bandwidth of a second fixed network accessed by the Wi-Fi network; and when the bandwidth of the second fixed network is greater than a second bandwidth threshold, switching from the SISO mode to the MIMO mode, where the first bandwidth threshold is less than or equal to the second bandwidth threshold.

With reference to the sixth aspect or the first possible implementation of the sixth aspect, in a second possible implementation of the sixth aspect, a fluctuation value of a bandwidth of a fixed network accessed by the Wi-Fi network is greater than a fourth preset threshold.

According to still another aspect of this application, a readable storage medium is provided. The readable storage medium stores instructions, and when the readable storage medium runs on a device, the device is enabled to perform the mode switching method in a Wi-Fi network according to any one of the first aspect or the possible implementations of the first aspect, any one of the second aspect or the possible implementations of the second aspect, or any one of the third aspect or the possible implementations of the third aspect.

According to still another aspect of this application, a computer program product is provided. When the computer program product runs on a computer, the computer is enabled to perform the mode switching method in a Wi-Fi network according to any one of the first aspect or the possible implementations of the first aspect, any one of the second aspect or the possible implementations of the second aspect, or any one of the third aspect or the possible implementations of the third aspect.

It may be understood that the terminal device, the computer storage medium, or the computer program product in any mode switching method in a Wi-Fi network provided above is configured to perform the corresponding method provided above. Therefore, for beneficial effects that can be achieved by the terminal device, the computer storage medium, or the computer program product, refer to beneficial effects in the corresponding method provided above. Details are not described herein again.

DESCRIPTION OF EMBODIMENTS

In this application, "at least one" means one or more, and "a plurality of" means two or more. The term "and/or" describes an association relationship between associated objects and represents that three relationships may exist. For example, A and/or B may represent the following cases: Only A exists, both A and B exist, and only B exists, where A and B may be singular or plural. "At least one item (piece) of the following" or a similar expression thereof means any combination of these items, including a singular item (piece) or any combination of plural items (pieces). For example, at least one of a, b, or c may represent a, b, c, a-b, a-c, b-c, or a-b-c, where a, b, and c may be singular or plural. The character "/" generally indicates an "or" relationship between the associated objects. In addition, in the embodiments of this application, words such as "first" and "second" do not limit a quantity and an execution sequence.

It should be noted that, in this application, the word "example" or "for example" is used to represent giving an example, an illustration, or a description. Any embodiment or design scheme described as an "example" or "for example" in this application should not be explained as being more preferred or having more advantages than another embodiment or design scheme. Exactly, use of the word "example" or "for example" or the like is intended to present a relative concept in a specific manner.

Figure 1:
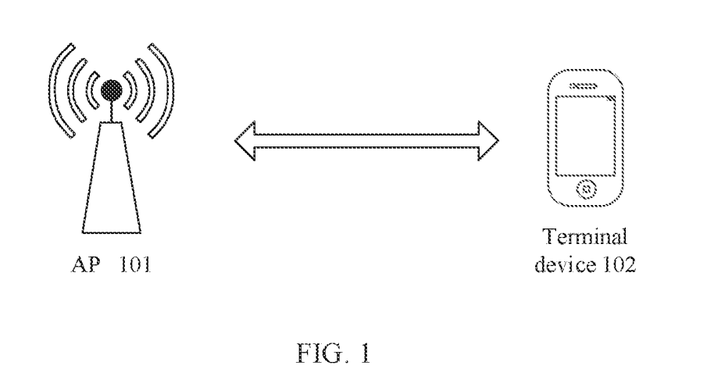
FIG. 1 is a schematic structural diagram 1 of a Wi-Fi wireless communications system according to an embodiment of this application.

FIG. 1 is a schematic structural diagram of a Wi-Fi wireless communications system according to an embodiment of this application. Referring to FIG. 1, the system includes an access point (access point, AP) 101 and one or more stations (station, STA) 102. The AP 101 may provide a wireless Wi-Fi access service for the STA 102, and allow the STA 102 to access and provide data access. The AP 101 may be a communications server, a router, a switch, a bridge, a computer, or the like. The STA 102 may be a terminal device, for example, a mobile phone, a tablet computer, an ultra-mobile personal computer (Ultra-mobile Personal Computer, UMPC), a netbook, a wearable device (for example, a smart band or a smart watch), or a vehicle-mounted device. In this embodiment of this application, the STA 102 may also be referred to as a terminal device 102. In FIG. 1, one terminal device 102 is used as an example for description.

In this embodiment of this application, both the AP 101 and the terminal device 102 may support a multiple input multiple output (Multiple Input Multiple Output, MIMO) mode and a single input single Output (Single Input Single Output, SISO) mode. For ease of description, the MIMO mode and the SISO mode are described by using the terminal device 102 as an example. When the terminal device 102 is in the MIMO mode, the terminal device 102 can support receiving and sending of a plurality of data streams. In this case, the terminal device 102 may separately receive and send the plurality of data streams by using a plurality of antennas. When the terminal device 102 is in the SISO mode, the terminal device 102 can support receiving and sending of a single data stream. In this case, the terminal device 102 may receive and send one data stream by using one antenna.

Figure 2:
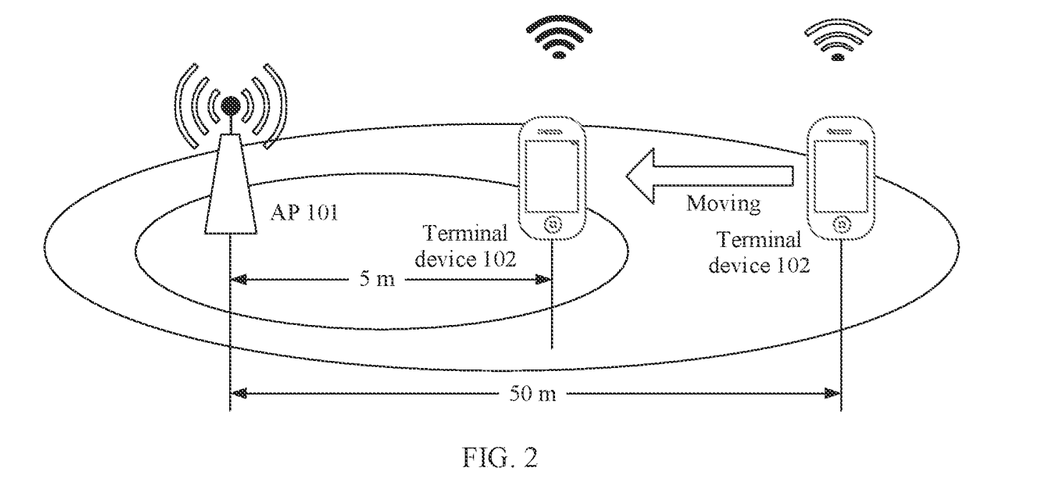
FIG. 2 is a schematic structural diagram 2 of a Wi-Fi wireless communications system according to an embodiment of this application.

After the terminal device 102 accesses a Wi-Fi network provided by the AP the terminal device 102 and the AP 101 determine a communication mode through negotiation based on maximum communication capabilities supported by the terminal device 102 and the AP 101. After the negotiation, the terminal device 102 and the AP 101 communicate in the MIMO mode, and the terminal device 102 is always in the MIMO mode in a subsequent communication process. Consequently, power consumption of the terminal device greatly increases, and a battery life of the terminal device is affected. However, in actual application, a Wi-Fi environment in which the terminal device 102 is located may change due to factors such as movement of the terminal device 102 or a change of a service carried on the terminal device 102. The terminal device 102 can ensure a current network requirement of the terminal device in the SISO mode. For example, as shown in FIG. 2, the terminal device 102 moves closer to the AP (moves from a position 50 m away from the AP to a position 5 m away from the AP), and received signal strength of the Wi-Fi network received by the terminal device 102 gradually increases, so that the terminal device can provide relatively good network quality in the SISO mode. Alternatively, a user disables some services on the terminal device 102 or some services previously running on the terminal device 102 have been completely executed. Services carried by the terminal device 102 are reduced, so that the terminal device can provide a sufficient network bandwidth in the SISO mode. For example, in bandwidths of 20 MHz and 40 MHz in an 802.11n protocol and in a bandwidth of 40 MHz in an 802.11ac protocol, network access rates corresponding to the MIMO mode and the SISO mode may be shown in the following Table 1. HT in Table 1 represents a bandwidth. The MIMO mode is described by using 2×2 as an example.

TABLE 1

| Protocol and bandwidth | Access rate (Mbps) in a SISO mode | Access rate (Mbps) in a MIMO (2 × 2) mode |
| --- | --- | --- |
| 802.11n (HT20) | 72.2 | 144.4 |
| 802.11n (HT40) | 150 | 300 |
| 802.11ac (HT80) | 433.3 | 866.7 |

Based on this, the embodiments of this application provide a mode switching method in a Wi-Fi network arid a terminal device, to reduce power consumption of the terminal device, and further reduce impact on a battery life of the terminal device. A principle thereof lies in that, after the terminal device accesses a Wi-Fi network, the terminal device obtains an access parameter (for example, signal strength or a throughput) of the Wi-Fi network and/or a device parameter (for example, a temperature value) of the terminal device. When the obtained access parameter and/or the obtained device parameter meet/meets a first switching condition (in this case, the terminal device can provide relatively good network quality), the terminal device switches from the MIMO mode to the SISO mode, to reduce power consumption of the terminal device, and further reduce impact on the battery life of the terminal device.

Figure 3:
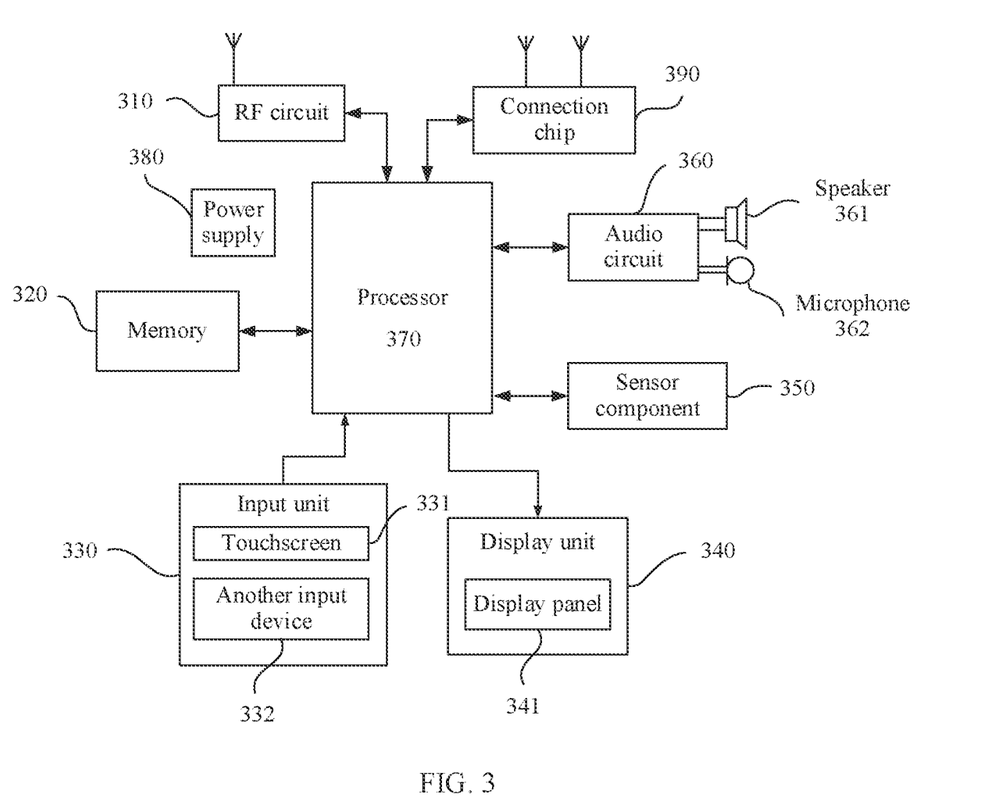
FIG. 3 is a schematic structural diagram 1 of a terminal device according to an embodiment of this application.

FIG. 3 is a schematic structural diagram of a terminal device 102 according to an embodiment of this application. Referring to FIG. 3, an example in which the terminal device 102 is a mobile phone is used for description. The mobile phone includes components such as a radio frequency (radio frequency, RF) circuit 310, a memory 320, an input unit 330, a display unit 340, a sensor component 350, an audio circuit 360, a processor 370, and a power supply 380. Each component of the mobile phone is described below in detail with reference to FIG. 3.

The RF circuit 310 may be configured to receive a signal and send a signal in an information sending and receiving process or a call process. Usually, the RF circuit 310 includes but is not limited to an antenna, an amplifier, a transceiver, a coupler, an LNA (low noise amplifier, low noise amplifier), a duplexer, and the like. Optionally, the antenna may include a plurality of receive antennas and a plurality of transmit antennas. In addition, the RF circuit 310 may further communicate with a network and another device through wireless communication, for example, communicate with an AP through a Wi-Fi network.

The memory 320 may be configured to store a software program and a module. The processor 370 runs the software program and the module that are stored in the memory 320, to implement various function applications and data processing of the mobile phone. The memory 320 may mainly include a storage program area and a storage data area, where the storage program area may store an operating system, an application program required by at least one function, and the like, and the storage data area may store data (such as audio data, image data, and a phone book) that is created based on use of the Mobile phone, and the like. In addition, the memory 320 may include a high-speed random access memory, and may further include a non-volatile memory, for example, at least one magnetic disk storage device, a flash storage device, or another volatile solid-state storage device.

The input unit 330 may be configured to receive input digit or character information and generate key signal input related to user settings and function control of the mobile phone. Specifically, the input unit 330 may include a touchscreen 331 and another input device 332. The touchscreen 331 is also referred to as a touch panel, and may collect a touch operation (for example, an operation performed by a user on or near the touchscreen 331 by using any proper object or accessory such as a finger or a stylus) performed by the user on or near the touchscreen 331, and drive a corresponding connection apparatus by using a preset program. The another input device 332 may include but is not limited to one or more of a physical keyboard, a function key (such as a volume control key or a power on/off key), a trackball, a mouse, a joystick, or the like.

The display unit 340 may be configured to display information entered by the user or information provided for the user, and various menus of the mobile phone. The display unit 340 may include a display panel 341. Optionally, the display panel 341 may be configured in a form of a liquid crystal display (liquid crystal display, LCD), an organic light-emitting diode (organic light-emitting diode, OLED), and the like. Further, the touchscreen 331 may cover the display panel 341. After detecting the touch operation on or near the touchscreen 331, the touchscreen 331 sends the touch operation to the processor 370 to determine a type of a touch event. Then, the processor 370 provides corresponding visual output on the display panel 341 based on the type of the touch event. Although the touchscreen 331 and the display panel 341 in FIG. 3 are used as two independent components to implement input and output functions of the mobile phone, in some embodiments, the touchscreen 331 and the display panel 341 may be integrated to implement the input and output functions of the mobile phone.

The sensor component 350 includes one or more sensors, and is configured to provide status evaluation in various aspects for the mobile phone. The sensor component 350 may include a temperature sensor, an acceleration sensor, a gyro sensor, a magnetic sensor, or a pressure sensor. The sensor component 350 may detect a temperature change of the mobile phone, an acceleration/deceleration, an orientation, an on/off state, relative positioning of the component, or the like. In addition, the sensor component 350 may further include an optical sensor, for example, a CMOS or CCD image sensor, configured for use in an imaging application.

The audio circuit 360, a speaker 361, and a microphone 362 may provide an audio interface between the user and the mobile phone. The audio circuit 360 may convert received audio data into an electrical signal and transmit the electrical signal to the speaker 361, and the speaker 361 converts the electrical signal into a sound signal and outputs the sound signal. In addition, the microphone 362 converts a collected sound signal into an electrical signal, and the audio circuit 360 receives the electrical signal and converts the electrical signal into audio data, and outputs the audio data to the RF circuit 310 to send the audio data to, for example, another mobile phone, or outputs the audio data to the memory 320 for further processing.

The processor 370 is a control center of the mobile phone, is connected to each part of the entire mobile phone through various interfaces and by using various lines, and executes various functions and data processing of the mobile phone by running or executing the software program and/or the module that are/is stored in the memory 320 and invoking data stored in the memory 320, to perform overall monitoring on the mobile phone. Optionally, the processor 370 may include one or more processing units. Preferably, the processor 370 may integrate an application processor and a modem processor. The application processor mainly processes an operating system, a user interface, an application program, and the like. The modem processor mainly processes wireless communication. It may be understood that the modem processor may alternatively not be integrated into the processor 370.

The mobile phone further includes the power supply 380 (for example, a battery) that supplies power to each component. Preferably, the power supply may be logically connected to the processor 370 through a power management system, to implement functions such as charging management, discharging management, and power consumption management through the power management system.

Further, the mobile phone may further include a connectivity (connectivity) chip 390. A wireless fidelity (wireless fidelity, Wi-Fi) chip may be integrated into the chip 390, In this embodiment of this application, an antenna that receives or sends a plurality of data streams or a single data stream may be an antenna of the Wi-Fi chip. In addition, the chip 390 may further integrate one or more of a Bluetooth module, a near field communication (near field communication, NFC) module, a global navigation satellite system (global navigation satellite system, GNSS) module, or a frequency modulation (frequency modulation, FM) module. Details are not described herein in this application.

A person skilled in the art may understand that a structure of the mobile phone shown in FIG. 3 does not constitute a limitation on the mobile phone, and the mobile phone may include more or fewer components than those shown in the figure, or combine some components, or have a different component arrangement.

Figure 4:
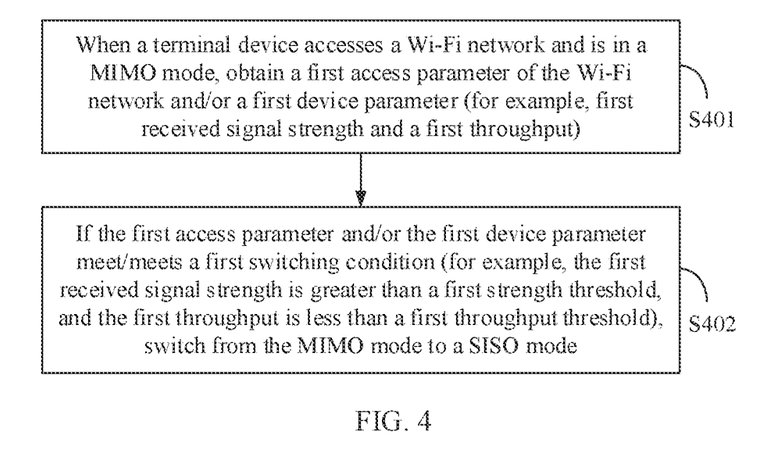
FIG. 4 is a schematic flowchart 1 of a mode switching method in a Wi-Fi network according to an embodiment of this application.

FIG. 4 is a schematic flowchart of a mode switching method in a Wi-Fi network according to an embodiment of this application. Referring to FIG. 4, the method includes the following several steps.

S401: When a terminal device accesses a Wi-Fi network and is in a MIMO mode, the terminal device obtains a first access parameter of the Wi-Fi network and/or a first device parameter (for example, the terminal device obtains first received signal strength and a first throughput of the Wi-Fi network).

The terminal device supports the MIMO mode. The MIMO mode may be represented as an M×N mode, M is used to represent a quantity of multiple inputs, N is used to represent a quantity of multiple outputs, and both M and N are integers greater than or equal to 2. For example, M×N is 2×2, 3×3, or 2×3. In addition, an AP that provides an access service of the Wi-Fi network also supports the MIMO mode. When the terminal device communicates with the AP, a quantity of multiple inputs used by the AP may be equal to a quantity of multiple outputs used by the terminal device, and a quantity of multiple outputs used by the AP may be equal to a quantity of multiple inputs used by the terminal device. For example, the terminal device uses a 2 x 3 mode, and the AP uses a 3×2 mode.

In addition, the first access parameter is an access parameter used when the terminal device is in the MIMO mode, and may include at least one of the following parameters: received signal strength, a throughput, a channel bandwidth, a user network access bandwidth, a guard interval (guard interval, GI), a bandwidth of a fixed network, or the like. The following describes each access parameter.

The received signal strength may be strength of a signal received by the terminal device in the Wi-Fi network, and for example, is indicated by using a received signal strength indicator (received signal strength indicator, RSSI) of the terminal device. A process in which the terminal device obtains the received signal strength may include: The terminal device measures a received signal at a Wi-Fi physical layer by using an integrated Wi-Fi chip, to obtain the received signal strength.

The throughput may refer to an amount of data successfully transmitted by the terminal device per unit of time. A process in which the terminal device obtains the throughput may include: counting a quantity of bytes sent and received by the terminal device in a period of time, and determining, based on the quantity of bytes in the period of time, the amount of data successfully transmitted per unit of time. The throughput is related to a link rate at the physical layer. For example, the throughput is about 70% of the link rate at the physical layer. In the following example, the terminal device may alternatively obtain the link rate at the physical layer, and use the link rate instead of the throughput as the access parameter for determining.

The channel bandwidth may be a bandwidth occupied by a signal. For example, the channel bandwidth may be 20 megahertz (MHz), 40M, 80M, or the like. A process in which the terminal device obtains the channel bandwidth may include: The terminal device may obtain a working status of the Wi-Fi physical layer, to obtain the channel bandwidth.

The user network access bandwidth may refer to a maximum internet (Internet) access rate of a user. The user network access bandwidth may also be referred to as an internet service provider speed (Internet Service Provider Speed, ISP Speed). The user network access bandwidth may be set by the user for the terminal device.

The GI may be a guard interval between different data blocks obtained by dividing a same sent data frame, and is used to ensure data transmission reliability, so that a receive side can correctly parse out each data block. GIs may be classified into a long guard interval (long GI) and a short guard interval (short GI). A process in which the terminal device obtains the GI may include: The terminal device may obtain the working status of the Wi-Fi physical layer, to obtain the GI.

The bandwidth of the fixed network refers to a maximum internet access rate of a broadband service provided by a fixed line. The bandwidth of the fixed network may be set by the user for the terminal device.

In addition, the first device parameter is a device parameter of the terminal device in the MIMO mode, and may include a temperature value of the terminal device. A change of the temperature value is related to power consumption of the terminal device. In actual application, the terminal device may obtain the temperature value of the terminal device through measurement by using a built-in temperature sensor or the like. Optionally, the device parameter of the terminal device may further include another similar device parameter related to the power consumption of the terminal device.

Specifically, when the terminal device accesses the Wi-Fi network, the terminal device negotiates a communication capability with the AP that provides the access service of the Wi-Fi network, for example, negotiates a modulation and coding scheme (modulation and coding scheme, MCS) and the like. The terminal device negotiates with the AP based on maximum communication capabilities of the terminal device and the AP. In this way, the terminal device is in the MIMO mode when accessing the Wi-Fi network. To be specific, the terminal device can send a plurality of data streams to the AP, and receive a plurality of data streams from the AP. When the terminal device is in the MIMO mode, the terminal device may obtain the first access parameter, or obtain the first device parameter, or obtain both the first access parameter and the first device parameter.

Optionally, the terminal device may obtain the first access parameter and/or the first device parameter in real time, or may periodically obtain the first access parameter and/or the first device parameter, or may aperiodically obtain the first access parameter and/or the first device parameter. This is not specifically limited in this embodiment of this application.

S402: If the first access parameter and/or the first device parameter meet/meets a first switching condition (for example, the first received signal strength is greater than a first strength threshold and the first throughput is less than a first throughput threshold), the terminal device switches from the MIMO mode to a SISO mode.

Specifically, when the terminal device obtains only one first access parameter or only one first device parameter, the terminal device may determine, based on the only one obtained first access parameter or only one obtained first device parameter, whether the terminal device needs to switch from the MIMO mode to the SISO mode. When the terminal device obtains a plurality of first access parameters or obtains at least one first access parameter and at least one first device parameter, the terminal device may determine, based on the plurality of first access parameters or the at least one first access parameter and the at least one first device parameter, whether the terminal device needs to switch from the MIMO mode to the SISO mode. The first switching condition may include determining for different parameters and thresholds corresponding to the different parameters.

For example, the terminal device obtains only the first received signal strength, and if the first received signal strength is greater than the first strength threshold, the terminal device switches from the MIMO mode to the SISO mode. Alternatively, the terminal device obtains only the first throughput, and if the first throughput is less than the first throughput threshold, the terminal device switches from the MIMO mode to the SISO mode. Alternatively, the terminal device obtains only a bandwidth of a first fixed network, and if the bandwidth of the first fixed network is less than a first bandwidth threshold, the terminal device switches from the MIMO mode to the SISO mode. Alternatively, the terminal device obtains only a first temperature value, and if the first temperature value is greater than a first temperature threshold, the terminal device switches from the MIMO mode to the SISO mode.

For example, the terminal device obtains the first received signal strength and the first throughput, and if the first received signal strength is greater than the first strength threshold and the first throughput is less than the first throughput threshold, the terminal device switches from the MIMO mode to the SISO mode. Alternatively, the terminal device obtains the first received signal strength and the first temperature value, and if the first received signal strength is greater than the first strength threshold and the first temperature value is greater than the first temperature threshold, the terminal device switches from the MIMO mode to the SISO mode.

It should be noted that the first strength threshold, the first throughput threshold, the first bandwidth threshold, the first temperature threshold, and the like may be preset by a person skilled in the art based on an actual situation. For example, the first strength threshold may be −65 dBm or −76 dBm, the first throughput threshold may be 30 Mbps or 10 Mbps, the first bandwidth threshold may be 100 Mbps, and the first temperature threshold may be 40° C.

Optionally, when the terminal device switches from the MIMO mode to the SISO mode, the terminal device may perform switching according to a related regulation in a Wi-Fi protocol. Specifically, the terminal device may interact, by using an action (action) frame, with the AP that provides the access service of the Wi-Fi network. For example, the terminal device may use the action frame to carry a mode switching bit (bit) to negotiate with the AP, so as to switch from the MIMO mode to the SISO mode. Alternatively, the terminal device interacts, by using an association (association or re-association) frame, with the AP that provides the access service of the Wi-Fi network. For example, the terminal device sets, in the association frame, an MCS rate set used by the SISO mode, so as to switch from the MIMO mode to the SISO mode It should be noted that the action frame may be used by the AP and the terminal device to negotiate a working mode, and the association frame may be used by the AP and the terminal device to negotiate an association. For detailed descriptions of the action frame and the association frame, refer to related descriptions in the conventional technology. Details are not described in this embodiment of this application.

Figure 5:
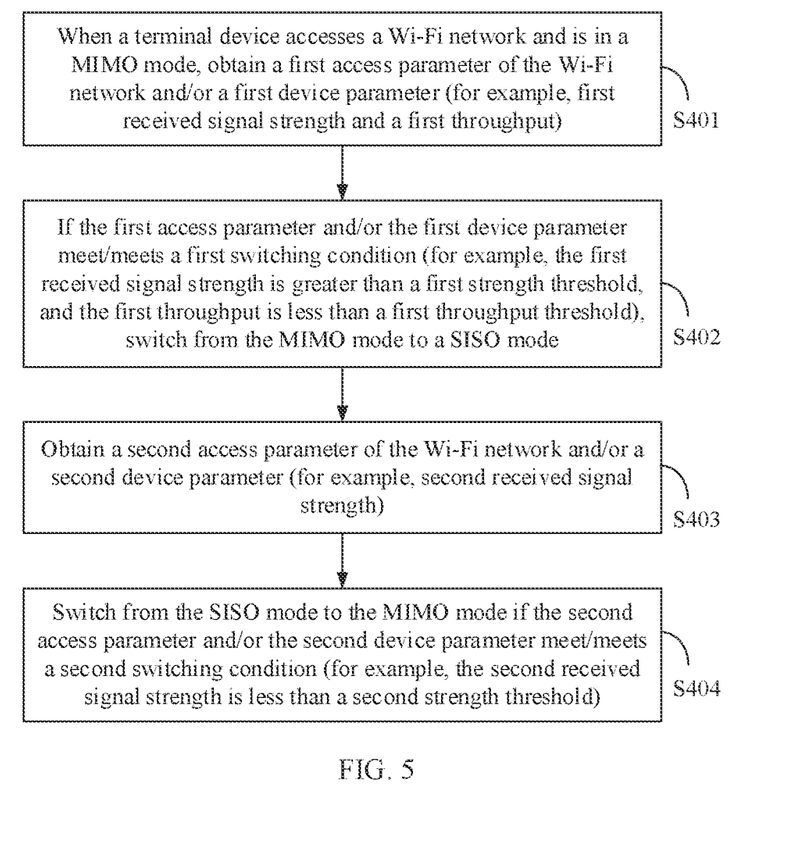
FIG. 5 is a schematic flowchart 2 of a mode switching method in a Wi-Fi network according to an embodiment of this application.

Further, after S402, referring to FIG. 5, the method further includes S403 and S404.

S403: The terminal device obtains a second access parameter of the Wi-Fi network and/or a second device parameter (for example, second received signal strength).

The second access parameter is an access parameter used when the terminal device is in the SISO mode, and may include at least one of the following parameters: received signal strength, a throughput, a channel bandwidth, a user network access bandwidth, a guard interval (guard interval, GI), a bandwidth of a fixed network, or the like. The second device parameter is a device parameter of the terminal device in the SISO mode, and may include a temperature value of the terminal device. It should be noted that detailed descriptions of the second access parameter and the second device parameter are similar to the related descriptions of the first access parameter and the first device parameter, and are not described in this embodiment of this application.

Optionally, after the terminal device switches from the MIMO mode to the SISO mode, the terminal device may also obtain the second access parameter and/or the second device parameter in real time, or may periodically obtain the second access parameter and/or the second device parameter, or may aperiodically obtain the second access parameter and/or the second device parameter. This is not specifically limited in this embodiment of this application.

S404: If the second access parameter and/or the second device parameter meet/meets a second switching condition (for example, the second received signal strength is less than a second strength threshold), the terminal device switches from the SISO mode to the MIMO mode.

Specifically, when the terminal device obtains only one second access parameter or only one second device parameter, the terminal device may determine, based on the only one obtained second access parameter or the only one obtained second device parameter, whether the terminal device needs to switch from the SISO mode to the MIMO mode. When the terminal device obtains a plurality of second access parameters or obtains at least one second access parameter and at least one second device parameter, the terminal device may determine, based on the plurality of second access parameters or the at least one second access parameter and the at least one second device parameter, whether the terminal device needs to switch from the MIMO mode to the SISO mode. The second switching condition may also include determining for different parameters and thresholds corresponding to the different parameters.

For example, the terminal device obtains only the second received signal strength, and if the second received signal strength is less than the second strength threshold, the terminal device switches from the MIMO mode to the SISO mode. Alternatively, the terminal device obtains only a second throughput, and if the second throughput is greater than a second throughput threshold, the terminal device switches from the MIMO mode to the SISO mode. Alternatively, the terminal device obtains only a bandwidth of a second fixed network, and if the bandwidth of the second fixed network is greater than a second bandwidth threshold, the terminal device switches from the MIMO mode to the SISO mode. Alternatively, the terminal device obtains only a second temperature value, and if the second temperature value is less than a second temperature threshold, the terminal device switches from the MIMO mode to the SISO mode.

For example, the terminal device obtains the second received signal strength and the second throughput, and if the second received signal strength is less than the second strength threshold and the second throughput is greater than the second throughput threshold, the terminal device switches from the MIMO mode to the SISO mode. Alternatively, the terminal device obtains the second throughput and the second temperature value, and if the second throughput is greater than the second throughput threshold and the second temperature value is less than the second temperature threshold, the terminal device switches from the MIMO mode to the SISO mode.

It should be noted that the second strength threshold, the second throughput threshold, the second bandwidth threshold, the second temperature threshold, and the like may be preset by a person skilled in the art based on an actual situation. For example, the second strength threshold may be −76 dBm the second throughput threshold may be 30 Mbps, the second bandwidth threshold may be 100 Mbps, and the second temperature threshold may be 40° C. In addition, the second strength threshold may be less than or equal to the first strength threshold, the second throughput threshold may be less than or equal to the first throughput threshold, the second bandwidth threshold may be greater than or equal to the first bandwidth threshold, and the second temperature threshold may be less than or equal to the first temperature threshold. Similarly, there may also be a specific value relationship between different thresholds corresponding to any other parameter. Details are not described in this embodiment of this application.

Specifically, the terminal device may also interact, by using an action frame or an association (re-association) frame, with the AP that provides the access service of the Wi-Fi network, so as to switch from the SISO mode to the MIMO mode. For example, the terminal device uses the action frame to carry a mode switching bit (bit) to negotiate with the AP, so as to switch from the SISO mode to the MIMO mode. Alternatively, the terminal device sets, in the association frame, an MCS rate set used by the MIMO mode, so as to switch from the SISO mode to the MIMO mode.

For example, as shown in the following Table 2, the signal strength, the throughput, the temperature, and the bandwidth of the fixed network are used as examples herein to separately describe a switching condition of the terminal device from the MIMO mode to the SISO mode and a switching condition of the terminal device from the SISO mode to the MIMO mode.

TABLE 2

| Trigger factor | Switching direction: from MIMO to SISO | Switching direction: from SISO to MIMO |
|---|---|---|
| Signal strength (RSSI) | RSSI > −65 dBm and TPUT < 30 Mbps | RSSI < −76 dBm |
| Throughput (TPUT) | TPUT < 10 Mbps and RSSI > −76 dBm | TPUT > 30 Mbps and TEMPT < 40° C. |
| Temperature (TEMPT) | TEMPT > 40° C. and RSSI > −76 dBm | Do not proactively switch back to MIMO |
| Bandwidth of a fixed network | Bandwidth of the fixed network < 100 Mbps | Bandwidth of the fixed network > 100 Mbps |

In the foregoing Table 2, when the trigger factor is the RSSI or the TPUT, and the switching direction is from the MIMO to the SISO, an example in which the first access parameter is the RSSI and the TPUT is used for description. The trigger factor of the RSSI may be applied to a scenario in which the RSSI changes. In other words, a fluctuation value of the RSSI is greater than a first preset threshold. The trigger factor of the TPUT may be applied to a scenario in which the TPUT changes. In other words, a fluctuation value of the TPUT is greater than a second preset threshold. When the trigger factor is the temperature, the trigger factor may be applied to a scenario in which the temperature changes. In other words, a fluctuation value of the temperature value of the terminal device is greater than a third preset threshold. When the trigger factor is the bandwidth of the fixed network, the trigger factor may be applied to a scenario in which the bandwidth of the fixed network changes. In other words, a fluctuation value of the bandwidth of the fixed network is greater than a fourth preset threshold. It should be noted that Table 2 is merely an example, and constitutes no limitation on this embodiment of this application. In addition, the first preset threshold, the second preset threshold, the third preset threshold, and the fourth preset threshold may be preset. This is not specifically limited in this embodiment of this application.

In this embodiment of this application, when trigger factors are different, switching from the MIMO mode to the SISO mode can be quickly and accurately implemented by obtaining corresponding access parameters or device parameters in a different mode, so that power consumption of the terminal device can be reduced to a maximum extent, and a battery life of the terminal device can be ensured. In addition, switching from the SISO mode to the MIMO mode can also be quickly and accurately implemented, so that performance of a service running on the terminal device can be improved and user experience can be improved when power consumption of the terminal device is relatively low.

In addition, when the terminal device is in the MIMO mode or the SISO mode, a feature of determining, by obtaining the access parameter or the temperature value of the terminal device, whether to perform switching between the MIMO mode and the SISO mode is determined that: an operation is simple and easy to be implemented. A feature of determining, by obtaining the plurality of access parameters and/or the temperature value of the terminal device, whether to perform switching between the MIMO mode and the SISO mode is that: an operation is simple and easy to be implemented, and compared with a feature of determining, by obtaining only one access parameter or the temperature value of the terminal device, whether to perform switching between the MIMO mode and the SISO mode is determined, switching accuracy of this solution is higher. In this way, power consumption of the terminal device can be reduced more effectively, and a battery life of the terminal device can be ensured.

Figure 6:
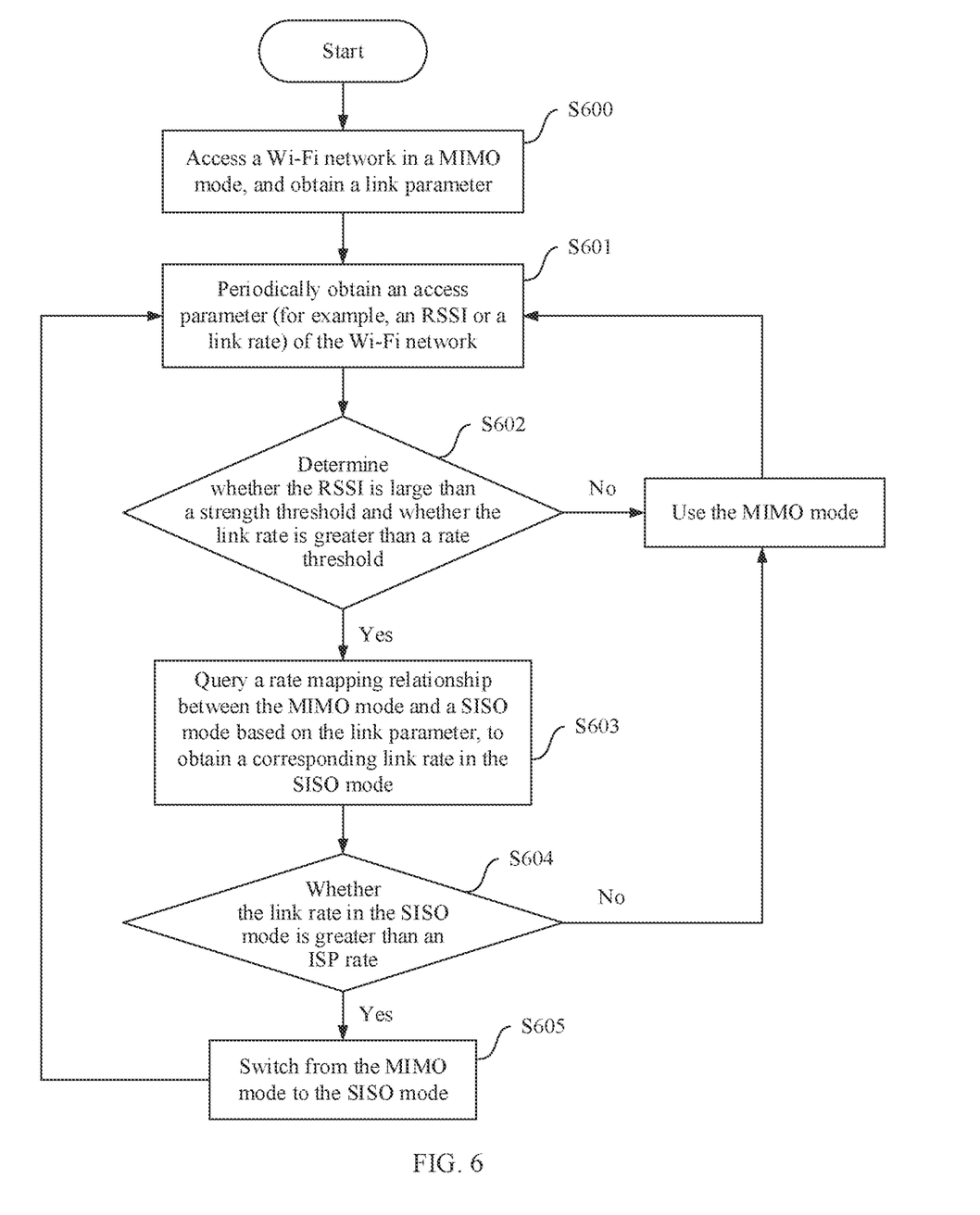
FIG. 6 is a schematic flowchart 3 of a mode switching method in a Wi-Fi network according to an embodiment of this application.

For ease of understanding, the method provided in this embodiment of this application is described herein by using an example in which the MIMO mode is a 2×2 mode. Specifically, when the terminal device accesses the Wi-Fi network and is in the MIMO mode, as shown in FIG. 6, the method may include the following steps: S601: The terminal device periodically obtains an access parameter of the Wi-Fi network. For example, the access parameter includes signal strength (RSSI) and a link speed (link speed). S602: Determine whether the RSSI is greater than a strength threshold and whether the link rate is greater than a rate threshold; and if the RSSI is greater than the strength threshold and the link rate is greater than the rate threshold, perform S605 (that is, switch from the MIMO mode to the SISO mode), or if the RSSI is not greater than the strength threshold and whether the link rate is not greater than the rate threshold, maintain the MIMO mode. When the terminal device is in the SISO mode or the MIMO mode, S601 may be returned for continue execution. Correspondingly, in S602, if the terminal device is in the MIMO mode, the strength threshold used during determining may be specifically the first strength threshold, and the rate threshold may be specifically the first rate threshold. If the terminal device is in the SISO mode, the strength threshold used during determining may be specifically the second strength threshold, and the rate threshold may be specifically the second rate threshold, Similarly, when other different parameters are used in S602, thresholds of the different parameters used during determining are also consistent with a current mode of the terminal device.

Further, before S601, the method may further include: S600: The terminal device obtains a link parameter. For example, the link parameter may include: a channel bandwidth (HT), a guard interval (GI), an ISP speed, and the like. Correspondingly, after the terminal device determines the RSSI is greater than the strength threshold and the link rate is greater than the rate threshold in S602, and before S605 is performed, the terminal device may further perform other determining, in other words, perform S603 to S604. Specifically, S603: Query a rate mapping relationship between the MIMO mode and the SISO mode based on the foregoing link parameter (for example, the HT and the GI), to obtain a corresponding link rate in the SISO mode. S604: Determine whether the corresponding link rate in the SISO mode is greater than the ISP Speed, and if the corresponding link rate in the SISO mode is greater than the ISP Speed, perform S605, or if the corresponding link rate in the SISO mode is not greater than the ISP Speed, maintain the MIMO mode. S605: Switch from the MIMO mode to the SISO mode.

For example, the rate mapping relationship between the MIMO mode and the SISO mode may be shown in Table 3. In Table 3, an example in which the HT includes 20 MHz, 40 MHz, and 80 MHz, and the GI includes a long GI and a short GI is used for description.

TABLE 3

| | MIMO (2 × 2) link rate (Mbps) | SISO (1 × 1) link rate (Mbps) |
|---|---|---|
| HT 20 + long GI | 130 | 65 |
| HT 20 + short GI | 144.4 | 72.7 |
| HT 40 + long GI | 270 | 135 |

TABLE 3-continued

| | MIMO (2 × 2) link rate (Mbps) | SISO (1 × 1) link rate (Mbps) |
|---|---|---|
| HT 40 + short GI | 300 | 150 |
| HT 80 + long GI | 780 | 390 |
| HT 80 + short GI | 866.6 | 433.3 |

It should be noted that the rate mapping relationship between the MIMO mode and the SISO mode may be preset. This is not specifically limited in this embodiment of this application. Table 3 is merely an example, and does not constitute any limitation on this embodiment of this application.

Figure 7:
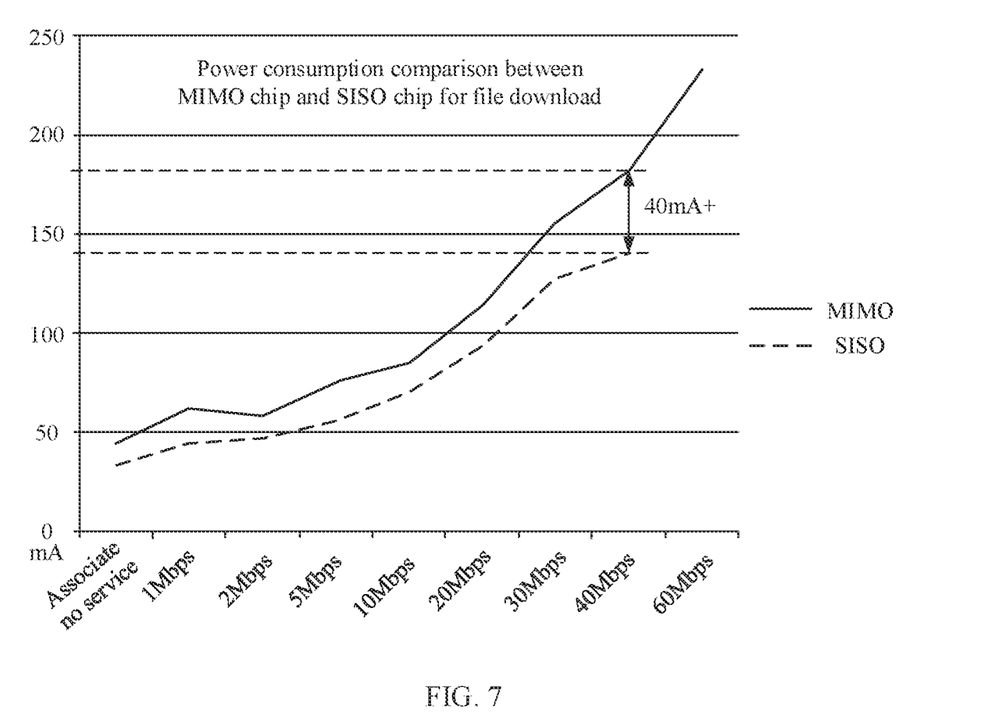
FIG. 7 is a schematic diagram of power consumption when a terminal device downloads a network file according to an embodiment of this application.

For example, an example in which the terminal device downloads a network file by using a Wi-Fi network in the 802.11n protocol is used. FIG. 7 is a schematic diagram of power consumption of the terminal device when downloading a file at different link rates in a MIMO mode and a SISO mode respectively. In FIG. 7, when a user network access bandwidth is 50 Mbps, if the terminal device is in the SISO mode and a channel bandwidth is 20 MHz, a maximum link rate of 72.2 Mbps at a physical layer can be provided, and a theoretical throughput of a TCP service can also reach 65 Mbps. In this case, if signal quality of a Wi-Fi network accessed by the terminal device is good, a throughput requirement for downloading the file can be met in the SISO mode, and power consumption of the terminal device in the SISO mode is lower. Compared with power consumption of the terminal device in the MIMO mode at a same rate, the power consumption of the terminal device in the SISO mode is reduced by about 30%.

In this embodiment of this application, when the terminal device accesses the Wi-Fi network and is in the IMMO mode, the terminal device may obtain a first access parameter of the Wi-Fi network, and switch from the MIMO mode to the SISO mode when determining, based on the first access parameter, that the current network quality is relatively good, to reduce power consumption of the terminal device, and reduce impact on a battery life of the terminal device. In the SISO mode, the terminal device may obtain a second access parameter of the Wi-Fi network, and switch from the SISO mode to the MIMO mode when determining, based on the second access parameter, that the current network quality is relatively poor, to ensure reliability of a user service and improve user experience.

It may be understood that, to implement the foregoing functions, the terminal device includes a corresponding hardware structure and/or software module for performing each function. A person of ordinary skill in the art should easily be aware that, in combination with the examples described in the embodiments disclosed in this specification, units, algorithms, and steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the embodiments of the present invention.

In the embodiments of this application, the terminal device may be divided into functional modules based on the foregoing method examples. For example, each functional module may be obtained through division based on each corresponding function, or two or more functions may be integrated into one processing module. The integrated module may be implemented in a form of hardware, or may be implemented in a form of a software functional module. It should be noted that, in this embodiment of the present invention, module division is an example, and is merely a logical function division. In actual implementation, another division manner may be used.

Figure 8:
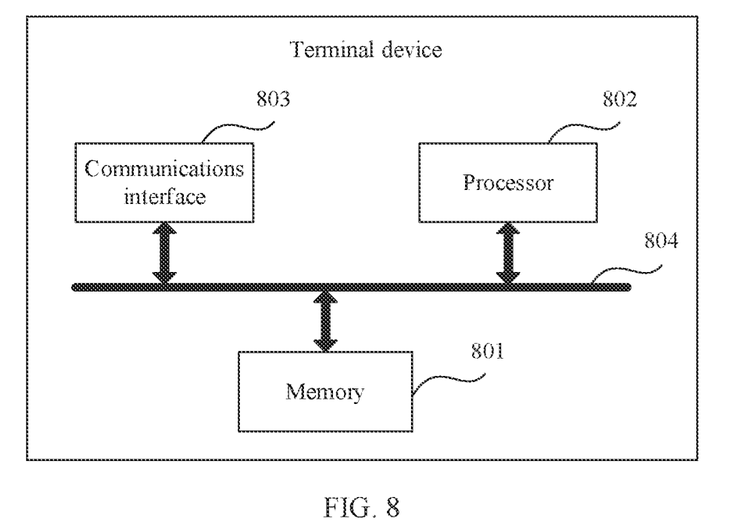
FIG. 8 is a schematic structural diagram 2 of a terminal device according to an embodiment of this application.

FIG. 8 is a schematic structural diagram of a terminal device according to an embodiment of this application. Referring to FIG. 8, the terminal device includes a memory 801 and a processor 802. The memory 801 is configured to store program code and data of the terminal device, and the processor 802 is configured to control and manage an action of the terminal device, for example, is specifically configured to support the terminal device in performing S401 to S404 and S600 to S605 in the foregoing method embodiments, and/or another process used for the technology described in this specification. Optionally, the terminal device shown in FIG. 8 may further include a communications interface 803, and the communications interface 803 is configured to support the terminal device in performing communication.

The processor 802 may be a central processing unit, a general-purpose processor, a digital signal processor, an application-specific integrated circuit, a processing chip, a field programmable gate array or another programmable logical device, a transistor logical device, a hardware component, or any combination thereof. The processor 802 may implement or execute various example logical blocks, modules, and circuits described with reference to content disclosed in the embodiments of this application. Alternatively, the processor 802 may be a combination of processors implementing a computing function, for example, a combination of one or more microprocessors, or a combination of the digital signal processor and a microprocessor. The communications interface 803 may be a transceiver, a transceiver circuit, a transceiver interface, or the like. The memory 801 may be a volatile memory, a non-volatile memory, or the like.

For example, the communications interface 803, the processor 802, and the memory 801 are connected to each other by using a bus 804. The bus 804 may be a peripheral component interconnect (Peripheral Component Interconnect, PCI) bus, an extended industry standard architecture (Extended Industry Standard Architecture, EISA) bus, or the like. The bus 804 may be classified into an address bus, a data bus, a control bus, and the like. For ease of representation, only one thick line is used to represent the bus in FIG. 8, but this does not mean that there is only one bus or only one type of bus. Optionally, the memory 801 may be included in the processor 802.

Optionally, the terminal device shown in FIG. 8 may alternatively be built in a terminal device as a chip system.

The memory 801 may be the memory 320 shown in FIG. 3, the processor 802 may be the memory 370 shown in FIG. 3, and the communications interface 803 may be an integration of the connection chip 390 and the RF circuit 310 shown in FIG. 3.

In this embodiment of this application, when the terminal device is in a MIMO mode, and a received signal strength of the Wi-Fi network is relatively strong, a throughput is relatively low, a temperature value of the terminal is relatively large, or a bandwidth of a fixed network accessed by the Wi-Fi network is relatively small, the terminal device switches from the MIMO mode to a SISO mode, so that power consumption of the terminal device can be reduced, a battery life of the terminal device can be ensured, performance of a service running on the terminal device can be ensured, and therefore, user experience can be improved.

In the several embodiments provided in this application, it should be understood that the disclosed apparatus and method may be implemented in other manners. For example, the described apparatus embodiment is merely an example. For example, the module or unit division is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of this application essentially, or the part contributing to the conventional technology, or all or some of the technical solutions may be implemented in the form of a software product. The software product is stored in a storage medium and includes several instructions for instructing the terminal to perform all or some of the steps of the methods described in the embodiments of this application. The foregoing storage medium includes: any medium that can store program code, such as a USB flash drive, a removable hard disk, a ROM, a RAM, a magnetic disk, or an optical disc.

In conclusion, the foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A mode switching method implemented by a terminal device, wherein the mode switching method comprises:
   accessing a WI-FI network;
   communicating, in a multiple-input multiple-output (MIMO) mode, with an access point that provides an access service of the WI-FI network;
   obtaining a first received signal strength and a first throughput of the WI-FI network in the MIMO mode;
   switching from the MIMO mode to a single-input single-output (SISO) mode when the first received signal strength is greater than a first strength threshold and when the first throughput is less than a first throughput threshold;
   obtaining a second throughput of the WI-FI network and a temperature value of the terminal device in the SISO mode; and
   switching from the SISO mode to the MIMO mode when the second throughput is greater than a second throughput threshold and when the temperature value is less than a preset temperature threshold, wherein the second throughput threshold is greater than the first throughput threshold.

2. The mode switching method according toof claim 1, further comprising:
   obtaining a second received signal strength of the WI-FI network in the SISO mode; and
   switching from the SISO mode to the MIMO mode when the second received signal strength is less than a second strength threshold, wherein the first strength threshold is greater than the second strength threshold.

3. The mode switching method of claim 2, wherein a fluctuation value of a third received signal strength of the WI-FI network is greater than a first preset threshold.

4. The mode switching method of claim 2, wherein the first strength threshold is −65 decibel-milliwatts (dBm), wherein the second strength threshold is −76 dBm, and wherein the first throughput threshold is 30 megabits per second (Mbps).

5. The mode switching method of claim 1, wherein a fluctuation value of a third throughput of the WI-Fl network is greater than a second preset threshold.

6. The mode switching method of claim 1, wherein the first strength threshold is −76 decibel-milliwatts (dBm), wherein the first throughput threshold is 10 megabits per second (Mbps), wherein the second throughput threshold is 30 Mbps, and wherein the preset temperature threshold is 40 degrees Celsius (° C.).

7. A terminal device comprising:
   a memory configured to store instructions; and
   a processor coupled to the memory, wherein the instructions cause the processor to be configured to:
   access a WI-FI network;
   communicate, in a multiple-input multiple-output (MIMO) mode, with an access point that provides an access service of the WI-FI network;
   obtain a first received signal strength and a first throughput of the WI-FI network in the MIMO mode;
   switch from the MIMO mode to a single-input single-output (SISO) mode when the first received signal strength is greater than a first strength threshold and when the first throughput is less than a first throughput threshold; threshold.
   obtain a second throughput of the WI-FI network and a temperature value of the terminal device in the SISO mode; and
   switch from the SISO mode to the MIMO mode when the second throughput is greater than a second throughput threshold and when the temperature value is less than a preset temperature threshold, wherein the second throughput threshold is greater than the first throughput threshold.

8. The terminal device of claim 7, wherein the instructions further cause the processor to be configured to:
   obtain a second received signal strength of the WI-FI network in the SISO mode; and
   switch from the SISO mode to the MIMO mode when the second received signal strength is less than a second strength threshold, wherein the first strength threshold is greater than the second strength threshold.

9. The terminal device of claim 8, wherein a fluctuation value of a third received signal strength of the WI-FI network is greater than a first preset threshold.

10. The terminal device according toof claim 8, wherein the first strength threshold is −65 decibel-milliwatts (dBm), wherein the second strength threshold is −76 dBm, and wherein the first throughput threshold is 30 megabits per second (Mbps).

11. The terminal device of claim 7, wherein a fluctuation value of a third throughput of the WI-Fl network is greater than a second preset threshold.

12. The terminal device of claim 7, wherein the first strength threshold is −76 decibel-milliwatts (dBm), wherein the first throughput threshold is 10 megabits per second (Mbps), wherein the second throughput threshold is 30 Mbps, and wherein the preset temperature threshold is 40 degrees Celsius (° C.).

13. A computer program product comprising instructions stored on a non-transitory computer-readable medium that, when executed by a processor, cause a terminal device to:
   access a WI-Fl network;
   communicate, in a multiple-input multiple-output (MIMO) mode, with an access point that provides an access service of the WI-Fl network;
   obtain a first received signal strength and a first throughput of the WI-Fl network in the MIMO mode;
   switch from the MIMO mode to a single-input single-output (S ISO) mode when the first received signal strength is greater than a first strength threshold and when the first throughput is less than a first throughput threshold;
   obtain a second throughput of the WI-FI network and a temperature value of the terminal device in the SISO mode; and
   switch from the SISO mode to the MIMO mode when the second throughput is greater than a second throughput threshold and when the temperature value is less than a preset temperature threshold, wherein the second throughput threshold is greater than the first throughput threshold.

14. The computer program product of claim 13, wherein the processor is further configured to execute the instructions to cause the terminal device to:
   obtain a second received signal strength of the WI-FI network in the SISO mode; and
   switch from the SISO mode to the MIMO mode when the second received signal strength is less than a second strength threshold, wherein the first strength threshold is greater than the second strength threshold.

15. The computer program product of claim 14, wherein a fluctuation value of a third received signal strength of the WI-FI network is greater than a first preset threshold.

16. The computer program product of claim 14, wherein the first strength threshold is −65 decibel-milliwatts (dBm), wherein the second strength threshold is −76 dBm, and wherein the first throughput threshold is 30 megabits per second (Mbps).

17. The computer program product of claim 13, wherein a fluctuation value of a third throughput of the WI-Fl network is greater than a second preset threshold.

18. The computer program product of claim 13, wherein the first strength threshold is −76 decibel-milliwatts (dBm), wherein the first throughput threshold is 10 megabits per second (Mbps), wherein the second throughput threshold is 30 Mbps, and wherein the preset temperature threshold is 40 degrees Celsius (° C.).

* * * * *

UNITED STATES PATENT AND TRADEMARK OFFICE
CERTIFICATE OF CORRECTION

PATENT NO. : 11,882,521 B2
APPLICATION NO. : 17/413668
DATED : January 23, 2024
INVENTOR(S) : Tongbo Wang, Ming Zhou and Ji Ding It is certified that error appears in the above-identified patent and that said Letters Patent is hereby corrected as shown below:

In the Claims

Claim 2, Column 20, Line 10: "The mode switching method according toof claim 1," should read "The mode switching method of claim 1,"

Claim 7, Column 20, Line 50: "put threshold; threshold." should read "put threshold;"

Claim 10, Column 21, Line 4: "The terminal device according toof claim 8, wherein" should read "The terminal device of claim 8, wherein"

Signed and Sealed this
Nineteenth Day of March, 2024

Katherine Kelly Vidal
*Director of the United States Patent and Trademark Office*